US006565951B1

(12) United States Patent
Sugiyama et al.

(10) Patent No.: US 6,565,951 B1
(45) Date of Patent: May 20, 2003

(54) INK JET RECORDING SHEET

(75) Inventors: Naonobu Sugiyama, Ichikawa (JP); Yoshitaka Okumura, Chiba (JP); Hiromasa Kondo, Urawa (JP)

(73) Assignee: OJI Paper Co., Ltd., Tokyo (JP)

( * ) Notice: Subject to any disclaimer, the term of this patent is extended or adjusted under 35 U.S.C. 154(b) by 63 days.

(21) Appl. No.: 09/648,874

(22) Filed: Aug. 28, 2000

Related U.S. Application Data

(63) Continuation-in-part of application No. 08/726,408, filed on Oct. 3, 1996.

(30) Foreign Application Priority Data

Oct. 6, 1995 (JP) ........................................... 7-260198

(51) Int. Cl.[7] ................................................ B32B 3/00
(52) U.S. Cl. ...................................................... 428/195
(58) Field of Search ................................ 428/195, 500, 428/522

(56) References Cited

U.S. PATENT DOCUMENTS 4,371,582 A 2/1983 Sugiyama et al. .......... 428/341
4,832,984 A 5/1989 Hasegawa et al. ....... 346/135.1
4,877,680 A * 10/1989 Sakaki et al. ............... 428/332

FOREIGN PATENT DOCUMENTS

| | | |
|---|---|---|
| DE | 3132248 | 6/1982 |
| EP | 0 627 324 | 12/1994 |
| EP | 0 634 284 | 1/1995 |
| JP | 55-51585 | 4/1980 |
| JP | 56-148584 | 11/1981 |
| JP | 62-288076 | 12/1987 |
| JP | 1-188387 | 7/1989 |
| WO | 95/13194 | 5/1995 |

OTHER PUBLICATIONS

James P. Casey, "Pulp & Paper", Chemistry & Chemical Technology, Third Edition, vol. 4.

* cited by examiner

*Primary Examiner*—Bruce H. Hess
*Assistant Examiner*—Michael Grendzynski

(57) ABSTRACT

An ink-jet recording sheet, having an excellent ink absorption and capable of forming images with high color density and sharpness, includes a substrate and an ink-receiving layer, formed on the substrate, which includes a pigment, a self-emulsifying cationic resin including a water-insoluble acrylic copolymer having a cationic functional group and capable of being emulsified in water without assistance of an emulsifying agent, a water-soluble non-ionic polymeric material and a water-soluble cationic resin.

5 Claims, No Drawings

INK JET RECORDING SHEET

This application is a continuation-in-part application of application Ser. No. 08/726,408 filed on Oct. 3, 1996, the teachings of which are hereby incorporated by reference.

BACKGROUND OF THE INVENTION

1. Field of the Invention

The present invention relates to an ink jet recording sheet. More particularly, the present invention relates to an ink jet recording sheet having an enhanced capability of recording clear ink images at a high recording speed and a high resistance to blotting of ink.

2. Description of the Related Art

Currently, in the field of ink jet recording, due to the development of an ink jet color printer suitable for preparing colored hard copies at a high speed, it has become possible to obtain an ink jet print having a high image clarity and a high printing quality. Nevertheless, to further improve the print quality, chroma, appearance and clarity of images, a new recording sheet having an enhanced performance is required. Especially, due to the development of an ink jet printing system with high printing speed, resolution and chroma, the ink-jet recording material is required to have further enhanced properties, for example, enhanced ink-absorption speed, a high ink-absorption capacity and a regular ink-blotting property. To meet to these requirements, various types of recording sheets having an ink-receiving layer formed on a surface of a substrate have been produced.

For example, Japanese Unexamined Patent Publication No. 55-51585 discloses a coating layer comprising amorphous silica particles (having a particle size of 0.1 to 10.0 $\mu$m) and a polymeric binder formed on a substrate.

Japanese Unexamined Patent Publication No. 56-148584 discloses a recording sheet having an ink receiving layer formed on a surface of a substrate and comprising a porous inorganic pigment, for example, natural zeolite, synthetic zeolite, diatomaceous earth, fine particulate silicic acid or synthetic mica, which has a function of absorbing and holding a coloring material on a surface of a substrate.

Nevertheless, these conventional recording sheets are disadvantageous in that when the ink receiving layer is formed in a small amount, the printed ink spreads irregularly and blots on the surfaces of the recording sheets, and when the ink-receiving layer is formed in a large amount, the ink receiving layer is easily peeled off and a fine powder is formed on and scattered from the surface, even though the spreading and blotting of the ink can be prevented.

To solve the above-mentioned problem, an attempt was made to provide a recording sheet provided with an ink receiving layer containing an increased amount of a binder resin and having an enhanced mechanical strength. However, this type of recording sheet is disadvantageous in that the ink receiving layer exhibits an insufficient ink-absorbing capacity, and the printed ink spreads irregularly on the ink receiving layer and thus the resultant image quality is unsatisfactory. Therefore, it is difficult to provide a satisfactory resolution or reproduction of halftone colors.

Also, Japanese Unexamined Patent Publication No. 62-288,076 discloses a binder resin having an enhanced strength and comprising a water insoluble polymer resin prepared by reacting polyvinyl alcohol with acrylic acid and methyl methacrylate. However, since this water-insoluble polymer resin is anionic, and the main components of the ink are also anionic, the anionic ink is not easily and stably fixed to the ink-receiving layer formed from the anionic, water-insoluble polymer resin. Also, if the water-insoluble polymer resin is contained too large an amount in the ink receiving layer, the ink bleeds out with the lapse of time. Further, if the content of the water-insoluble polymer resin in the ink receiving layer is too small, the bonding strength-enhancing effect of the resin is insufficient.

As mentioned above, although various attempts have been made to produce ink jet recording sheets, it has not yet been possible to realize a new type of ink jet recording sheet having a satisfactory resistance to ink-blotting, a high ink-absorbing capacity, an excellent surface strength and the capability to form colored images with a high brightness.

SUMMARY OF THE INVENTION

An object of the present invention is to provide an ink jet recording sheet capable of recording clear images at a high recording speed without ink-blotting, in an ink jet recording system such as, for example an ink jet printer or an ink jet plotter, and having an excellent surface strength.

Another object of the present invention is to provide an ink jet recording sheet useful for an ink jet recording system for printing images such as letters, characters and pictures by using an aqueous ink, having a high ink-absorbing speed, a high resistance to blotting and spreading of ink dots, and a satisfactory capability of forming ink images having a high color brightness, a good dot shape and a high sharpness at the edges of the images, and thus being capable of recording the ink images with high resolution at high speed.

The above-mentioned objects can be attained by the ink jet recording sheet of the present invention, in which a substrate and an ink receiving layer are formed on at least one surface of the substrate and comprise a pigment and a binder, wherein the binder comprises (1) a self-emulsifying cationic resin consisting essentially of at least one water-insoluble acrylic copolymer having a cationic functional group, produced without using an emulsifying agent and capable of being emulsified in water without using an emulsifying agent; (2) an water-soluble non-ionic polymeric material comprising at least one member selected from the group consisting of polyvinyl alcohol, silanol group-modified polyvinyl alcohols, starch and oxidized starches; and (3) a water-soluble cationic resin comprising at least one member-selected from the group consisting of polydimethyldiallyl ammonium chloride, polyallylamine and polyoxypropylenemethyldiethyl ammonium chloride having 9 oxypropylene chain groups per molecule, the self-emulsifying cationic resin (1) is present in a content of 5 to 70% by weight based on the total weight of the binder, and the ink receiving layer contains no emulsifying agent.

Also, in the ink jet recording sheet of the present invention, the water-insoluble acrylic copolymer having cationic functional group is preferably a copolymerization product of at least one acrylic monomer selected from the group consisting of alkyl acrylates having 4 to 21 carbon atoms and alkyl methacrylates having 5 to 22 carbon atoms with at least one cationic, ethylenically unsaturated monomer having at least one cationic group selected from tert-amino groups and quaternary ammonium salt groups.

Further, in the ink jet recording sheet of the present invention, the pigment preferably comprises at least one white pigment selected from the group consisting of amorphous synthetic silica, alumina, hydrated alumina sol, aluminum silicate, magnesium silicate, precipitated calcium carbonate, ground calcium carbonate, calcium silicate, aluminum hydroxide, zeolite, calcined clay, kaolin clay, talc, white carbon and organic (plastic) pigments.

DESCRIPTION OF THE PREFERRED EMBODIMENTS

Generally speaking, in the preparation of an aqueous emulsion or latex of a conventional water-insoluble acrylic copolymer resin, an anionic, cationic, nonionic or polymeric emulsifying agent is used to stably emulsify or disperse the resin in water. However, it has became clear that the emulsifying agent causes the adhesion of the resultant coating layer, formed from the resin latex or emulsion, to the substrate and the water-resistance of the coating layer to be greatly reduced. Also, it has become clear that the emulsifying agent affects the surface tension of the ink applied to the coating layer so that the ink easily blots and spreads irregularly on the surface of the coating layer.

To remove the above-mentioned disadvantages, in the ink jet recording sheet of the present invention, the ink receiving layer comprises, as a binder, a self-emulsifying cationic resin consisting essentially of at least one water-insoluble acrylic copolymer having cationic functional groups, produced without using an emulsifying agent and capable of being emulsified in water without using an emulsifying agent, a water soluble non-ionic polymeric material and a water-soluble cationic resin. The self-emulsifying cationic resin usable for the present invention is used in the state of a self-emulsified aqueous latex or an emulsion containing no emulsifying agent. Therefore, the ink receiving layer of the present invention is quite free from the above-mentioned disadvantages derived from the emulsifying agent.

The water-insoluble, cationic acrylic copolymer usable for the self-emulsifying cationic resin of the present invention is preferably selected from copolymerization products of at least one acrylic monomer selected from the group consisting of alkyl acrylates having 4 to 21 carbon atoms, more preferably 6 to 19 carbon atoms, and alkyl methacrylates having 5 to 22 carbon atoms, more preferably 7 to 20 carbon atoms, with at least one cationic, ethylenically unsaturated monomer having at least one cationic group selected from tert-amino groups and quaternary ammonium groups.

The alkyl acrylates and alkyl methacrylates usable as the acrylic monomer are preferably selected from methyl methacrylate, ethyl methacrylate, butyl methacrylate, ethyl acrylate, butyl acrylate and 2-ethylhexyl acrylate.

The cationic groups in the cationic, ethylenically unsaturated monomer are not limited to specific groups. The cationic, ethylenically unsaturated monomer is preferably selected from those having at least one cationic groups of the following formulae (I) and (II):

(I)

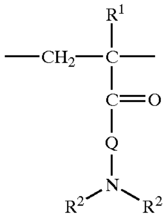

and

-continued (II)

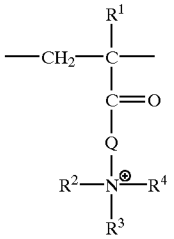

wherein $R^1$ represents a hydrogen atom or a lower alkyl group with 1 to 6 carbon atoms (, for example, methyl, ethyl or n-hexyl group), $R^2$, $R^3$ and $R^4$ represent respectively and independently from each other an alkyl group with 1 to 6 carbon atoms (, for example, methyl, ethyl or propyl group) or an aralkyl group with 7 to 10 carbon atoms, the groups $R^2$ and $R^3$ in the formula (I) or the groups $R^2$, $R^3$ and $R^4$ of the formula (II) may be fuse-bonded with the nitrogen atom to form a cyclic structure, Q represents a divalent organic group with 1 to 20 carbon atoms (, for example, $—OCH_2CH_2—$ group) and $X^-$ represents an anion.

In the cationic, self-emulsifying acrylic copolymer usable for the present invention, the cationic monomer is contained preferably in a molar content of 0.05 to 80%, more preferably 3 to 50%. Any other comonomer may be used unless the target effect of the present invention is obstructed.

There is no specific limitation to the polymerization method for producing the self-emulsifying cationic resin. For example, the self-emulsifying resin can be produced by an emulsifying agent-free seed polymerization method in which a water-soluble or water-dispersible polymer is prepared as a seed polymer, and then the seed polymer is further polymerized with a monomer added to the polymerization system, an emulsifying agent-free reactive emulsifying agent-polymerization method in which a chemical compound having an ethylenically unsaturated structure and a hydrophilic group is added as an emulsifying agent in place of the conventional emulsifying agent to the polymerization system, or an emulsifying agent-free oligomer-polymerization method in which an oligomer generated in the polymerization system and having a surface active property, is utilized to emulsify the resultant water-insoluble polymer in water.

The self-emulsifying acrylic copolymer usable as a binder resin for the ink receiving layer of the present invention exhibits a cationic property and thus the resultant ink receiving layer formed from the cationic acrylic copolymer exhibits an enhanced fixing property for the coloring material in the ink and an excellent water resistance, and the ink images formed on the ink receiving layer have an enhanced color density.

In the ink receiving layer of the present invention, the binder further contains a water-soluble non-ionic polymeric material and a water-soluble cationic resin, in addition to the cationic, self-emulsifying acrylic copolymer resin.

The non-ionic, water-soluble polymeric material comprises at least one polymer selected from polyvinyl alcohol, silanol group-modified polyvinyl alcohols, starch and oxidized starches. These water-soluble non-ionic polymeric material generally contribute to enhancing the ink-absorbing speed of the resultant ink-receiving layer.

The water-soluble cationic resin comprises at least one member selected from polydimethyldiallyl ammonium chloride, polyallylamine and polyoxypropylenemethyldiethyl ammonium chloride having 9 oxypropylene chain groups per molecule.

The water-soluble cationic resin is contributory to enhancing the color density of the images formed on the resultant image-receiving layer. Any other binder resin may be used unless the target effect of the present invention is hindered.

In the ink-receiving layer of the present invention, the cationic, self-emulsifying acrylic copolymer resin is contained in a content of from 5 to 70% by weight based on the total weight content of the binder in the ink-receiving layer. If the content of the cationic, self-emulsifying acrylic polymer resin is too small, the blot-preventing effect may become insufficient. If the non-ionic or cationic water-soluble resin is not used or used in too small an amount, the time necessary to absorb the ink in the ink-receiving layer may become long, even though the blot-preventing effect is high.

Since the self-emulsifying cationic resin can be easily emulsified in water without the assistance of an emulsifying agent, the ink receiving layer of the present invention can be formed by not using an emulsifying agent, and thus contains no emulsifying agent.

Preferably, the water-soluble non-ionic polymeric material is employed in an amount of 20 to 2000 parts by weight per 100 parts by weight of the cationic, self-emulsifying acrylic copolymer resin.

Also, the water-soluble cationic resin is employed preferably in an amount of 50 to 1500 parts by weight per 100 parts by weight of the cationic, self-emulsifying acrylic copolymer resin.

The pigment to be contained in the image receiving layer of the present invention preferably comprises at least one white pigment selected from the group consisting of amorphous synthetic silica, alumina, hydrated alumina sol, aluminum silicate, magnesium silicate, precipitated calcium carbonate, ground calcium carbonate, calcium silicate, aluminum hydroxide, zeolite, calcined clay, kaolin clay, talc, white carbon, and organic (plastic) pigments. The above-mentioned white pigments may be employed alone or in a mixture of two or more thereof.

Among the above-mentioned white pigments, the amorphous synthetic silica, alumina and hydrated alumina sol contribute to enhancing the ink-absorption of the resultant ink-receiving layer and the color density of the images formed on the ink-receiving layer, and thus are preferred for the present invention.

The pigment is employed preferably in a content of 40 to 90% by weight based on the total solid weight of the ink-receiving layer. If the content of the pigment is too small, the resultant ink-receiving layer may exhibit an unsatisfactory ink-absorption, and if the pigment content is too large, the resultant ink-receiving layer may have an insufficient mechanical strength.

The ink receiving layer of the present invention optionally contains an additive comprising at least one member selected from a pigment-dispersing agent, a defoaming agent, a coloring material, an antioxidant, an ultraviolet ray-absorbing agent, a viscosity modifier and a cross-linking agent, in response to the ink-receiving layer-forming conditions, the required image quality and the required performance of the ink jet recording sheet.

The substrate usable for the ink jet recording sheet of the present invention is preferably formed from a paper sheet comprising cellulose pulp, a synthetic paper sheet, or a transparent or opaque sheet made from a synthetic resin. The cellulose pulp to be contained in the paper sheet may be selected from ground wood pulps, sulfite pulps, kraft pulps, semi-chemical pulps, chemi-ground pulps and refiner-ground pulps produced mainly from soft woods, for example, Japanese red pine, Japanese black pine, silver fir, abies, and cedar tree woods and hard woods, for example, beech, birch and chinquapin tree woods and waste paper pulps.

When a paper sheet is used as a substrate of the ink jet recording sheet of the present invention, the paper sheet usually contains, in addition to the cellulose pulp, a pigment which is added to the pulp slurry. The pigment includes at least one member selected from inorganic pigments, for example, clay, talc, calcium carbonate, calcined kaolin, aluminum oxide, aluminum hydroxide, and titanium dioxide, and organic pigments, for example, urea resin particles. The paper sheet for the substrate optionally contains an additive selected from sizing agents, for example, rosin compounds, alkylketene dimers and alkenyl succinic acids, fixing agents, for example, aluminum sulfate and a cationic starch, and paper strengthening agents, for example, polyacrylamide polymers and starch. The additive is added to the pulp slurry. The pulp slurry containing the pigment and optionally the additive is subjected to paper-forming and is converted to a paper sheet.

The paper sheet usable for the substrate is optionally sized with a surface-sizing agent comprising at least one member selected from rosin compounds, petroleum resins, starch, starch derivatives, for example, oxidized starch, acetylated starch and hydroxyethylated starch, polyvinyl alcohol, polyvinyl alcohol derivatives, synthetic resin latexes comprising at least one of polymers and copolymers of styrene, ethylenically unsaturated amide compounds, acrylic esters, olefins, maleic acids and vinyl acetate, alkyl resins, and waxes.

The paper sheet is optionally calendered by a conventional calender, for example, a machine calender or a super calender, to control the thickness thereof.

The synthetic resin sheet or film usable as a substrate for the present invention, may be produced from a thermoplastic resin, typically polyester or polyolefin resin. The polyester resin includes polyethylene terephthalate, polybutylene terephthalate and polycyclohexene terephthalate. Also, the polyolefin resin includes polyethylene, polypropylene, ethylene-propylene copolymers, ethylene-vinyl acetate copolymers, and blends of two or more thereof. The thermoplastic resin usable for the synthetic resin sheet or film may be a mixture of a polystyrene with an acrylic acid ester copolymer. The synthetic resin sheet or film may be oriented in a longitudinal or a transverse direction.

The substrate for the ink-jet recording sheet of the present invention may be formed from a synthetic paper sheet which has a paper-like appearance and can be produced by mixing inorganic fine particles into a thermoplastic resin, forming a film from the mixture and orienting the film, for example, in biaxial directions. In the present invention, the substrate may be formed from a laminate containing a plurality of the synthetic paper sheets. For example, the laminate may be a two or three-layered composite sheet composed of a base sheet and at least one synthetic paper sheet laminated on at least one surface of the base sheet. Also, the laminate is preferably a three to five layered composite sheet composed of the above-mentioned two or three-layered composite sheet and one or two surface layers formed on the one or two surfaces of the two or three-layered composite sheet. The synthetic paper sheet made from a thermoplastic resin in the above-mentioned manner has a paper-like appearance and a good texture. The thermoplastic resin film or sheet usable as a substrate for the present invention is not limited to one having a specific opaqueness.

The ink receiving layer can be formed on at least one surface of the substrate by using a conventional coating method and apparatus, for example, a bar coater, air knife coater, blade coater, or gravure coater. The resultant coated sheet having the ink-receiving layer coated on the substrate can be used as an ink jet recording sheet of the present invention. Optionally, the resultant coated sheet is surface-treated with a calender, for example, a super calender or gloss calender, to impart an enhanced smoothness to the surface of the sheet.

There is no limitation to the amount of the ink receiving layer to be formed on the substrate. Preferably, the ink-receiving layer is in a dry weight of 1 to 30 $g/m^2$, more preferably 2 to 20 $g/m^2$.

If the amount of the ink receiving layer is too small, the resultant ink-receiving layer may exhibit an insufficient ink-absorbing capacity and the ink may spread or blot outside of the desired images, the resultant ink images may have unclear countours, and the drying time of the ink images may become long. Thus, the sheet delivery rolls of the printer may be stained by the wet ink images and then may soil the following recording sheets.

Also, if the amount of the image receiving layer is too large, the thick image-receiving layer may exhibit a reduced bonding strength to the substrate and thus may scale off from the substrate so that the resultant scales block the ink-jetting nozzle of the printer. Also, the thick image-receiving layer may cause an economical disadvantage.

In the ink jet recording sheet of the present invention, the ink receiving layer may have a multi-layered structure.

EXAMPLES

The present invention will be further explained by the following examples which are merely representative and are not intended to restrict the scope of the present invention in any way.

Example 1

An aqueous pulp slurry was prepared from 100 parts by weight of hard wood bleached kraft pulp mixed with 20 parts by weight of precipitated calcium carbonate particles, 0.8 part by weight of a cationic starch and 0.11 part by weight of a neutral sizing agent containing an alkenylsuccinic anhydride compound. The aqueous pulp slurry was fully stirred and subjected to a paper-forming process using a multi-cylinder Fourdrivier paper machine, and the resultant wet paper sheet was dried to a water content of 10% by weight. Then, an aqueous solution of 6% by weight of an oxidized starch was applied to both the surfaces of the dried paper sheet by a size-press method to size both surfaces of the paper sheet with the sizing agent in a total amount of 5 $g/m^2$, and the sized paper sheet was dried to a water content of 7% by weight. A fine paper sheet having a basis weight of 82 $g/m^2$ was obtained.

An aqueous coating liquid (1) was prepared in the following composition.

| Coating liquid (1) | |
|---|---|
| Amorphous synthetic silica $(*)_1$ | 73 wt % |
| Polyvinyl alcohol $(*)_2$ | 16.2 wt % |
| Self-emulsifying, water-insoluble, cationic acrylic copolymer resin latex $(*)_3$ | 10.8% by solid weight |

-continued

| Coating liquid (1) | |
|---|---|
| Amorphous synthetic silica $(*)_1$ | 72 wt % |
| Polyvinyl alcohol $(*)_2$ | 2.2 wt % |
| Oxidized starch $(*)_4$ | 8 wt % |
| Polydiallyldimethyl ammonium chloride $(*)_5$ | 6 wt % |
| Self-emulsifying, water-insoluble, cationic acrylic copolymer resin latex $(*)_3$ | 10.8% by solid weight |

Note:
$(*)_1$ . . . Trademark: Fineseal, made by Tokuyama
$(*)_2$ . . . Trademark: PVA 117, made by Kuraray
$(*)_3$ . . . Trademark: Sumikaflex 3911, made by Sumitomo Kagakukogyo
$(*)_4$ . . . Trademark: Ace A, made by Oji Corn Starch
$(*)_5$ . . . A water-soluble cationic resin having a molecular weight of about 50,000, trademark: PAS-H-5L, made by Nito Boseki K.K.

The aqueous coating liquid (1) was coated on a surface of the wood free paper by using a bar coater to produce a ink-jet recording sheet having an ink-receiving layer with an absolute dry weight of 15 $g/m^2$. An ink-jet recording sheet was obtained.

Example 2

An ink-jet recording sheet was produced by the same procedures and the same wood free paper sheet as in Example 1, with the following exceptions. The coating liquid (1) was replaced by an aqueous coating liquid (2) having the following composition.

| Coating liquid (2) | |
|---|---|
| Amorphous synthetic silica $(*)_1$ | 20 wt % |
| Calcium carbonate $(*)_6$ | 20 wt % |
| Silanol-modified polyvinyl alcohol $(*)_{13}$ | 49 wt % |
| Polyoxypropylenemethyldiethyl ammonium chloride $(*)_7$ | 8 wt % |
| Self-emulsifying, water-insoluble, cationic acrylic copolymer resin latex $(*)_3$ | 3% by solid weight |

Note:
$(*)_6$ . . . Trademark: Unibar 70, made by Shiraishi Kogyo
$(*)_7$ . . . A water-soluble cationic resin having 9 oxypropylene chain groups per molecule, trademark: Adecacol CC-9, made by Asahi Denkakogyo K.K.
$(*)_{13}$ . . . Trademark: PVA R-1130, made by Kuraray The coating liquid (2) was coated on a surface of the wood free paper sheet by using a bar coater to form an ink receiving layer having an absolute dry weight of 5 $g/m^2$.

Example 3

An ink-jet recording sheet was produced by the same procedure and the same wood free paper sheet as in Referential Example 1 with the following exceptions.

The coating liquid (1) was replaced by an aqueous coating liquid (3) having the following composition.

| Coating liquid (3) | |
|---|---|
| Alumina $(*)_8$ | 90 wt % |
| Polyvinyl alcohol $(*)_2$ | 2.4 wt % |

-continued

| Coating liquid (3) | |
|---|---|
| Polydiallyldimethyl ammonium chloride $(*)_5$ | 2 wt % |
| Water-insoluble, self-emulsifying, cationic acrylic copolymer resin emulsion $(*)_9$ | 5.6% by solid weight |

Note:
$(*)_8$ . . . Trademark: CAH-3000, made by Sumitomo Kagakukogyo
$(*)_9$ . . . Trademark: Boncoat SFC-302, made by Dainihon Inki. An emulsified polymer having an average particle size of 260 nm and a Tg of 0° C.

The coating liquid (3) was coated on a surface of the wood free paper sheet to form an ink-receiving layer having an absolute dry weight of 10 g/m$^2$.

Example 4

An ink-jet recording sheet was produced by the same procedures as in Example 1 with the following exceptions.

The wood free paper sheet was replaced by a multi-layered biaxially oriented synthetic paper sheet comprising a thermoplastic resin, provided with a surface layer containing an inorganic pigment, having a thickness of 110 $\mu$m and available under the trademark of Yupo FPG-110, from Oji Yukagoseishi K.K.

The coating liquid (1) was coated on a surface of the synthetic paper sheet by using a bar coater to form an ink-receiving layer having an absolute dry weight of 15 g/M$^2$.

Example 5

An ink-jet recording sheet was produced by the same procedures as in Example 1 with the following exceptions.

The wood free paper sheet was replaced by a polyethyleneterephthalate resin film having a thickness of 75 $\mu$m and available from Toray.

The coating liquid (1) was coated on a surface of the PET film by using a bar coater to form an ink-receiving layer having an absolute dry weight of 20 g/m$^2$.

Example 6

An ink-jet recording sheet was produced by the same procedures and the same wood free paper sheet as in Referential Example 1 with the following exceptions.

The coating liquid (1) was replaced by an aqueous coating liquid (4) having the following composition.

| Coating liquid (4) | |
|---|---|
| Amorphous synthetic silica $(*)_1$ | 60 wt % |
| Water-insoluble, self-emulsifying, cationic acrylic copolymer resin latex $(*)_9$ | 28% by solid weight |
| polydiallyldimethyl ammonium chloride $(*)_5$ | 12 wt % |

The coating liquid (4) was coated on a surface of the wood free paper sheet to form an ink-receiving layer having an absolute dry weight of 10 g/M$^2$.

Comparative Example 1

An ink-jet recording sheet was produced by the same procedures as in Example 1 except that the self-emulsifying, cationic acrylic copolymer resin latex (Sumikaflex 3911) was not employed.

Comparative Example 2

An ink-jet recording sheet was produced by the same procedures as in Example 2 except that the self-emulsifying, cationic acrylic copolymer resin latex (Sumikaflex 3911) was not employed.

Comparative Example 3

An ink-jet recording sheet was produced by the same procedures as in Example 1, with the following exception.

A surface of the same wood free paper sheet as in Example 1 was coated, by using a bar coater, with an aqueous coating liquid (5) having the following composition.

| Coating liquid (5) | |
|---|---|
| Amorphous synthetic silica $(*)_1$ | 40 wt % |
| Polyvinyl alcohol $(*)_2$ | 12 wt % |
| Water-insoluble, cationic acrylic copolymer emulsion $(*)_{10}$ | 48% by solid weight |

Note:
$(*)_{10}$ . . . An aqueous emulsion of a cationic acrylic copolymer resin prepared by an emulsion copolymerization using an emulsifying agent, trademark: Boncoat VO-8, made by Dainihon Inki.

The resultant ink-receiving layer on the wood free paper sheet had an absolute dry weight of 10 g/m$^2$.

Comparative Example 4

An ink-jet recording sheet was produced by the same procedures as in Example 1 with the following exceptions.

A surface of the wood free paper sheet is coated by an aqueous coating liquid (6) having the following composition, by using a bar coater.

| Coating liquid (6) | |
|---|---|
| Alumina $(*)_8$ | 67 wt % |
| Polyvinyl alcohol $(*)_2$ | 16.2 wt % |
| Polyoxypropylenemethyldiethyl ammonium chloride $(*)_7$ | 6 wt % |
| Water-insoluble, cationic vinyl acetate copolymer resin emulsion $(*)_{11}$ | 10.8% by solid weight |

Note:
$(*)_{11}$ . . . An aqueous emulsion of a water-insoluble, cationic vinyl acetate copolymer resin prepared by an emulsion polymerization using an emulsifying agent, trademark: Yodosol CE-58, made by Kanebo NSC K.K.

The resultant ink-receiving layer had an absolute dry weight of 10 g/m$^2$.

Comparative Example 5

An ink-jet recording sheet was prepared by the same procedures as in Comparative Example 4 with the following exceptions.

The coating liquid (6) was coated on a surface of the same synthetic paper sheet (Yupo FPG 110) as in Example 5 by using a bar coater, to form an ink-receiving layer with an absolute dry weight of 18 g/m$^2$.

Comparative Example 6

An ink-jet recording sheet was produced by the same procedures as in Example 1 with the following exceptions.

An aqueous coating liquid (7) having the composition as shown below was prepared.

| Coating liquid (7) | |
|---|---|
| Amorphous synthetic silica $(*)_1$ | 67 wt % |
| Polyvinyl alcohol $(*)_2$ | 16.2 wt % |
| Polydiallyldimethyl ammonium chloride $(*)_5$ | 6 wt % |
| Water-insoluble, anionic carboxyl-modified styrene-butadiene copolymer emulsion $(*)_{12}$ | 10.8% by solid weight |

Note:
$(*)_{12}$ . . . An aqueous emulsion of a water-insoluble, anionic carboxyl-modified styrene-butadiene copolymer produced by an emulsion polymerization using an emulsifying agent, trademark: JSR0593, made by Nihon Goseigomu During the preparation of the coating liquid (7), the components agglomerated, and thus the coating procedure could not be carried out.

Tests

In each of the examples and comparative examples, the properties of the resultant ink-jet recording sheet were measured and evaluated by the following tests.

(1) Ink Absorption

An ink-jet recording sheet was printed in an ink-jet printer (trademark: BJC-820J, made by Canon) and the drying time of the printed ink images was determined by checking for reflected light from the ink images by the naked eye and measuring a time from a printing stage to a stage at which the reflected light from the ink image disappeared due to the completion of the drying of the ink images. The ink absorption was evaluated in the following five classes.

| Class | Drying time |
|---|---|
| 5 | Less than 4 seconds |
| 4 | 4 seconds or more but less than 7 seconds |
| 3 | 7 seconds or more but less than 10 seconds |
| 2 | 10 seconds or more but less than 15 seconds |
| 1 | 15 seconds or more |

(2) Brightness of Colored Images

By using the ink-jet printer (BJC-820J), an ink-jet recording sheet was printed with each of yellow, magenta and cyan inks, and the resultant colored images was observed by the naked eye, and evaluated in the following five classes.

| Class | Sharpness of colored images |
|---|---|
| 5 | Extremely excellent |
| 4 | Excellent |
| 3 | Good |
| 2 | Slightly dark |
| 1 | Dark and unclear |

(3) Form and Size of Dots

By using the ink-jet printer (BJC-820J, made by Canon) an ink-jet recording sheet was ink-jet-printed, and the form and size of the dots were observed by using a zoom stereoscope (made by Sener K.K.) at a magnification of 50, and evaluated in the following classes.

| Class | | Form and size of dots |
|---|---|---|
| 5 | Form: | True circle |
| | Size: | No increase occurred |
| 4 | Form: | Approximately true circle |
| | Size: | Very small increase occurred |
| 3 | Form: | Circular |
| | Size: | Small increase occurred |
| 2 | Form: | Irregular |
| | Size: | Considerable increase occurred |
| 1 | Form: | Very bad |
| | Size: | Significant increase occurred |

(4) Blotting of Colored Inks When Mixed

By using the ink-jet printer (BJC-820J), an ink-jet recording sheet was printed with cyan and yellow colored inks so that the colored ink images were overlapped each other, and the resultant overlapped colored images were observed by the naked eye and evaluated into the following five classes.

| Class | Blotting of colored inks |
|---|---|
| 5 | None |
| 4 | Very small |
| 3 | Permissible |
| 2 | Significant |
| 1 | Very significant |

(5) Surface Strength

An adhesive tape was adhered to an ink-receiving layer surface of a ink-jet recording sheet and rapidly peeled off the surface. The total area of the peeled portions of the ink-receiving layer was observed by the naked eye. The surface strength of the ink-jet recording sheet was indicated in the following three classes.

| Class | Surface strength |
|---|---|
| 3 | Excellent |
| 2 | Satisfactory |
| 1 | Bad |

The test results are shown in Table 1.

TABLE 1

| Example No. | Item | Ink absorption | Sharpness of colored images | Form and size of dots | Blotching of overlapped colored ink images | Surface strength |
|---|---|---|---|---|---|---|
| Example | 1 | 5 | 5 | 5 | 5 | 3 |
| | 2 | 5 | 4 | 5 | 5 | 3 |
| | 3 | 5 | 5 | 5 | 5 | 3 |
| | 4 | 5 | 5 | 5 | 5 | 3 |
| | 5 | 5 | 5 | 5 | 5 | 3 |
| | 6 | 4 | 5 | 5 | 5 | 3 |
| Comparative Example | 1 | 5 | 1 | 1 | 1 | 2 |
| | 2 | 5 | 3 | 3 | 3 | 1 |
| | 3 | 2 | 3 | 2 | 2 | 2 |
| | 4 | 4 | 2 | 2 | 2 | 2 |
| | 5 | 4 | 2 | 2 | 2 | 2 |
| | 6 | — | — | — | — | — |

Table 1 clearly shows that the ink-jet recording sheets of Examples 1 to 6 in accordance with the present invention exhibited excellent ink absorption and sharpness of colored images, a satisfactory form of the dots, a high resistance to an increase in size of the dots, a high resistance to blotting of the ink images overlapped on each other and a superior surface strength, whereas the comparative ink jet recording sheets of Comparative Examples 1 to 5 were unsatisfactory in one or more of the above-mentioned test results. In the comparative coating liquid (7) of Comparative Example 6, the components agglomerated and thus the coating liquid (7) could not be employed for coating.

The ink jet recording sheet of the present invention exhibits not only excellent ink absorption and sharpness of the colored images but also a satisfactory form of the dots, a high resistance to an increase in size of the dots, a high resistance to blotting of the overlapped colored ink images and superior surface strength. Therefore, the ink jet recording sheet of the present invention is useful for forming fine and sharp images at a high speed not only in monochromatic printing but also in multichromatic or full color printing.

What is claimed is:

1. An ink jet recording sheet comprising a substrate and an ink receiving layer formed on at least one surface of the substrate and comprising a pigment and a binder, wherein the binder comprises (1) a self-emulsifying cationic resin consisting essentially of at least one water-insoluble acrylic copolymer having a cationic functional group; (2) a water-soluble non-ionic polymeric material comprising at least one member selected from the group consisting of polyvinyl alcohol, silanol group-modified polyvinyl alcohols, starch and oxidized starches; and (3) a water-soluble cationic resin comprising at least one member selected from the group consisting of polydimethyldiallyl ammonium chloride, polyallylamine and polyoxypropylenemethyldiethyl ammonium chloride having 9 oxypropylene chain groups per molecule, the self-emulsifying cationic resin (1) is present in a content of 5 to 70% by weight based on the total weight of the binder, and the ink receiving layer contains no emulsifying agent, said water-insoluble acrylic copolymer having a cationic functional group being a copolymerization product of at least one acrylic monomer selected from the group consisting of alkyl acrylates having 4 to 21 carbon atoms and alkyl methacrylates having 5 to 22 carbon atoms with at least one cationic, ethylenically unsaturated monomer having at least one cationic group selected from tert-amino groups and quaternary ammonium salt groups, without using an emulsifying agent, and being capable of being emulsified in water without using an emulsifying agent.

2. The ink-jet recording sheet as claimed in claim 1, wherein the pigment comprises at least one white pigment selected from the group consisting of amorphous synthetic silica, alumina, hydrated alumina sol, aluminum silicate, magnesium silicate, precipitated calcium carbonate, ground calcium carbonate, calcium silicate, aluminum hydroxide, zeolite, calcined clay, kaolin clay, talc, white carbon and organic pigments.

3. The ink jet recording sheet as claimed in claim 1, wherein in the water-insoluble acrylic copolymer, the acrylic monomer is selected from the group consisting of methyl methacrylate, ethyl methacrylate, butyl methacrylate, ethyl acrylate, butyl acrylate and 2-ethylhexyl acrylate.

4. The ink jet recording sheet as claimed in claim 1, wherein the cationic, ethylenically unsaturated monomer is selected from those having at least one cationic groups of the following formulae (I) and (II):

(I)

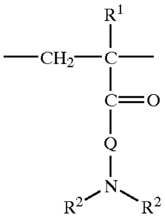

and (II)

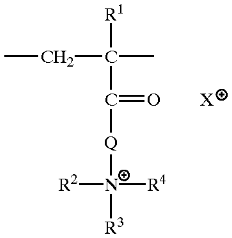

wherein $R^1$ represents a hydrogen atom or a lower alkyl group with 1 to 6 carbon atoms, $R^2$, $R^3$ and $R^4$ represent respectively and independently from each other an alkyl group with 1 to 6 carbon atoms or an aralkyl group with 7 to 10 carbon atoms, the groups $R^2$ and $R^3$ in the formula (I) or the groups $R^2$, $R^3$ and $R^4$ of the formula (II) may be fuse-bonded with the nitrogen atom to form a cyclic structure, Q represents a divalent organic group with 1 to 20 carbon atoms and $X^{\ominus}$ represents an anion.

5. The ink jet recording sheet as claimed in claim 1, wherein in the cationic, self-emulsifying acrylic copolymer, the cationic monomer is contained in a molar content of 0.05 to 80%.

* * * * *